US012448130B1

(12) United States Patent
Hemingway et al.

(10) Patent No.: US 12,448,130 B1
(45) Date of Patent: Oct. 21, 2025

(54) STEERABLE PARACHUTE FOR GUIDING A PAYLOAD TO A TARGET (71) Applicant: Government of the United States as represented by the Secretary of the Air Force, Wright-Patterson AFB, OH (US)

(72) Inventors: Griffin Hemingway, USAFA, CO (US); Jason Christopher, USAFA, CO (US); Enrique Arjona, USAFA, CO (US); Orval Powell, Colorado Springs, CO (US); Harold Fotso, USAFA, CO (US); Cayden Boll, Albuquerque, NM (US); Christian Lund, Provo, UT (US); Michael Anderson, Colorado Springs, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 28 days.

(21) Appl. No.: 18/638,115

(22) Filed: Apr. 17, 2024

(51) Int. Cl.
 B64D 17/34 (2006.01)
 B64D 17/24 (2006.01)
(52) U.S. Cl.
 CPC ............ B64D 17/34 (2013.01); B64D 17/24 (2013.01)
(58) Field of Classification Search
 CPC .................................. B64D 17/34; B64D 17/24
 See application file for complete search history.

(56) References Cited

U.S. PATENT DOCUMENTS

| 5,899,415 | A | * | 5/1999 | Conway | .................. B64D 1/08 244/152 |
|---|---|---|---|---|---|
| 6,056,237 | A | | 5/2000 | Woodland | |
| 6,343,244 | B1 | | 1/2002 | Yoneda | |
| 6,587,762 | B1 | | 7/2003 | Rooney | |
| 6,889,942 | B2 | | 5/2005 | Preston | |
| 7,059,570 | B2 | * | 6/2006 | Strong | ................. B64D 17/343 244/147 |
| 8,538,605 | B1 | | 9/2013 | Riley | |
| 8,738,383 | B2 | | 5/2014 | Schuck et al. | |
| 8,788,127 | B1 | | 7/2014 | Walso | |
| 8,939,056 | B1 | | 1/2015 | Neal, III | |
| 9,061,764 | B2 | | 6/2015 | Riley | |
| 2006/0032984 | A1 | * | 2/2006 | Preston | ............... G07F 17/3213 244/152 |
| 2012/0104151 | A1 | | 5/2012 | Mccann | |
| 2022/0324566 | A1 | | 10/2022 | Nikitenko | |

OTHER PUBLICATIONS

A steerable parachute according to an embodiment of the invention was tested by one or more inventors Apr. 23, 2023 at Lavell Edwards Stadium, Provo, UT.

* cited by examiner

Primary Examiner — Justin M Benedik
(74) Attorney, Agent, or Firm — AFMCLO/JAZ; Larry L. Huston (57) ABSTRACT

A steerable parachute for carrying a payload towards a target. The parachute has a canopy for drag during descent connects to a basket by variable length guy wires. A high cant drive system shortens or lengthens the guy wires to effect the cant of the canopy and thereby steer the parachute. The drive system is at least one of a coaxial opposed dual shaft system or a planetary gear system. This drive system provides the benefit of immediate and accurate course correction of the parachute during descent.

14 Claims, 9 Drawing Sheets

STEERABLE PARACHUTE FOR GUIDING A PAYLOAD TO A TARGET

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a steerable parachute having a dual reel drive system and more particularly to such a steerable parachute having a high cant drive system.

BACKGROUND OF THE INVENTION

Parachutes are commonly dropped from elevated heights such as aircraft, buildings, bridges, etc. The parachutes may be manned or unmanned and often used to carry a payload towards, and preferably to, a ground target. Unmanned parachutes are desirable from a standpoint of personnel safety during descent and not requiring subsequent evacuation from a hostile environment. But without guidance, an unmanned parachute cannot be steered towards a ground target. Such a parachute is subject to changing and prevailing wind conditions and may not accommodate sudden changes in target position.

Attempts to provide steering systems for unmanned parachutes are known in the art. For example, U.S. Pat. No. 7,059,570 to Strong teaches an aerial delivery device with a guidance system. But this attempt relies upon two parallel axis motors. A control signal to one motor may or may not be properly coordinated with the other motor. The parallel axis configuration requires undue footprint, limiting payload. Directing the parachute towards a target becomes more difficult. Clearly a new system is needed to overcome these drawbacks.

Figure 7:
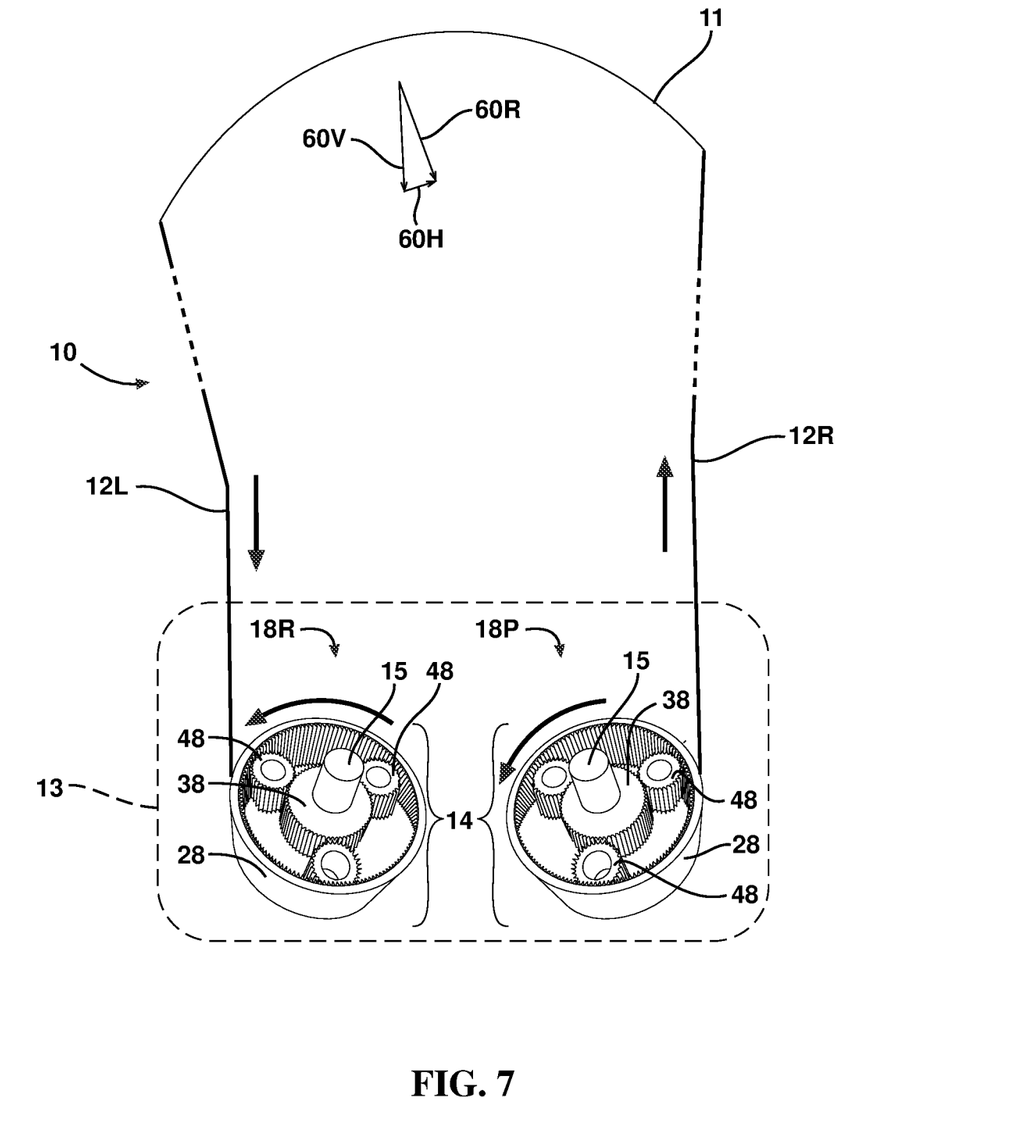
FIG. 7 is a fragmentary perspective view of another alternative embodiment of a drive system usable with a steerable parachute according to the present invention and having matched scale sun and planet drives and showing the basket in phantom.
Figure 8:
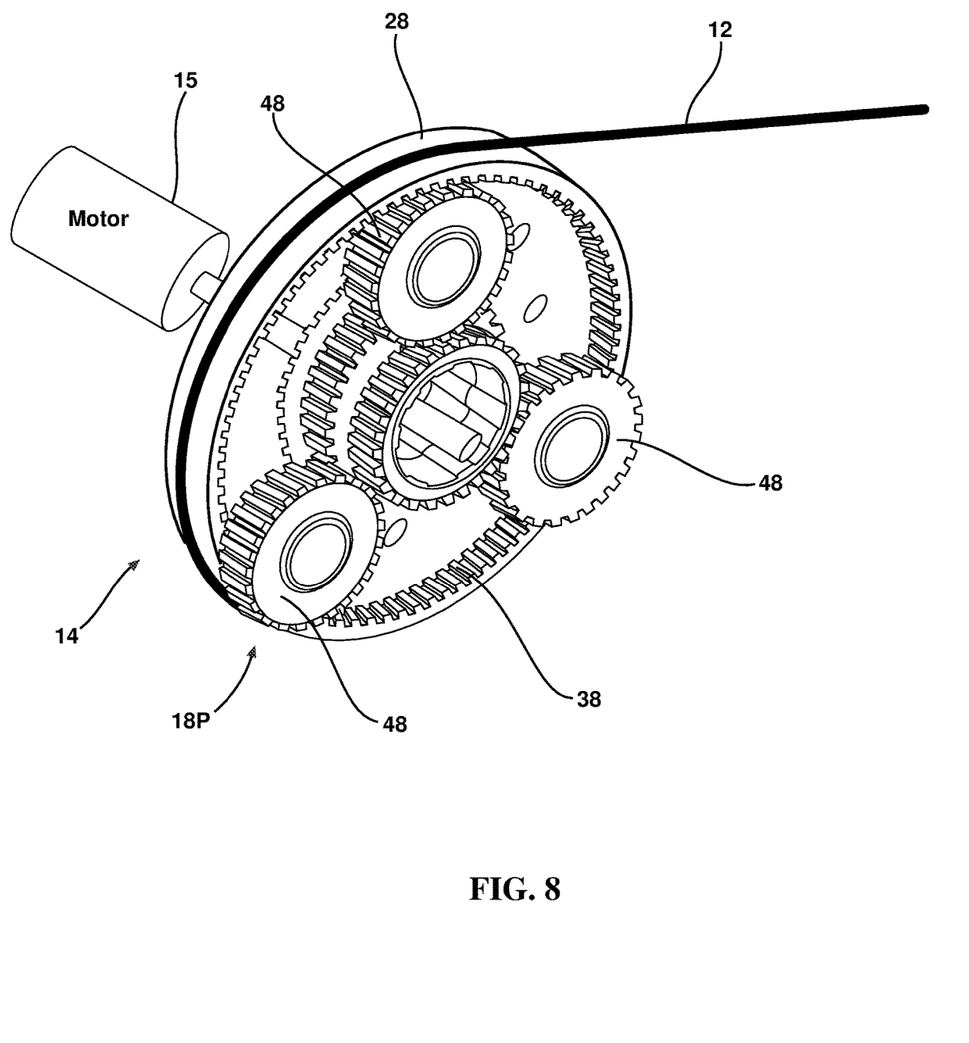
FIG. 8 is a scale perspective view of a dual layer drive system usable with the embodiment of FIG. 7.

The present invention overcomes these drawbacks with a high cant drive system. Collectively, the coaxial drive system of FIGS. 1A, 1B, 4, 5, 6 and the planetary gear drive system of FIGS. 7 and 8 are referred to herein as high cant drive systems 14 due to the improved responsiveness over the prior art in pitching the canopy 11 to guide the steerable parachute 10 towards a target TX. The cant may be thought of as the amount of inclination imparted to the canopy 11 per amount of rotation of the motor 15 output shaft 21.

Particularly, the coaxial drive systems 14 provide the high cant benefit that a single command from the controller 16 will direct one or more guy wires 12 as needed to promptly and simply correct a course towards a target TX during descent through command signals to the motor 15. The planetary gear 48 drive system 14 provides the high cant benefit that a command from the controller 16 has high gear multiplication/reduction values as needed to immediately and accurately correct a course towards a target TX during descent.

SUMMARY OF THE INVENTION

In one embodiment the invention comprises a steerable parachute for carrying a payload towards a target. The steerable parachute defines a longitudinal axis and comprises: a deployable canopy for providing drag or lift during descent of the steerable parachute; a basket for conveying payloads to the ground; a plurality of guy wires connecting the basket to the canopy at a like plurality of spaced apart attachment points; a high cant drive system for canting the canopy in a desired direction and comprising at least one motor, the at least one motor having opposed output shafts with a first shaft joined to a first guy wire and a second shaft joined to a second guy wire, whereby rotation of the output shafts shortens the first guy wire and/or lengthens the second guy wire to guide the steerable parachute in a desired direction; and a controller for sending command signals to the motor to impart rotation to the opposed output shafts.

BRIEF DESCRIPTION OF THE DRAWINGS

FIG. 1A1 is a schematic side elevational view of a reel usable with a drive system according to the present invention.

DETAILED DESCRIPTION OF THE INVENTION

Figure 1A:
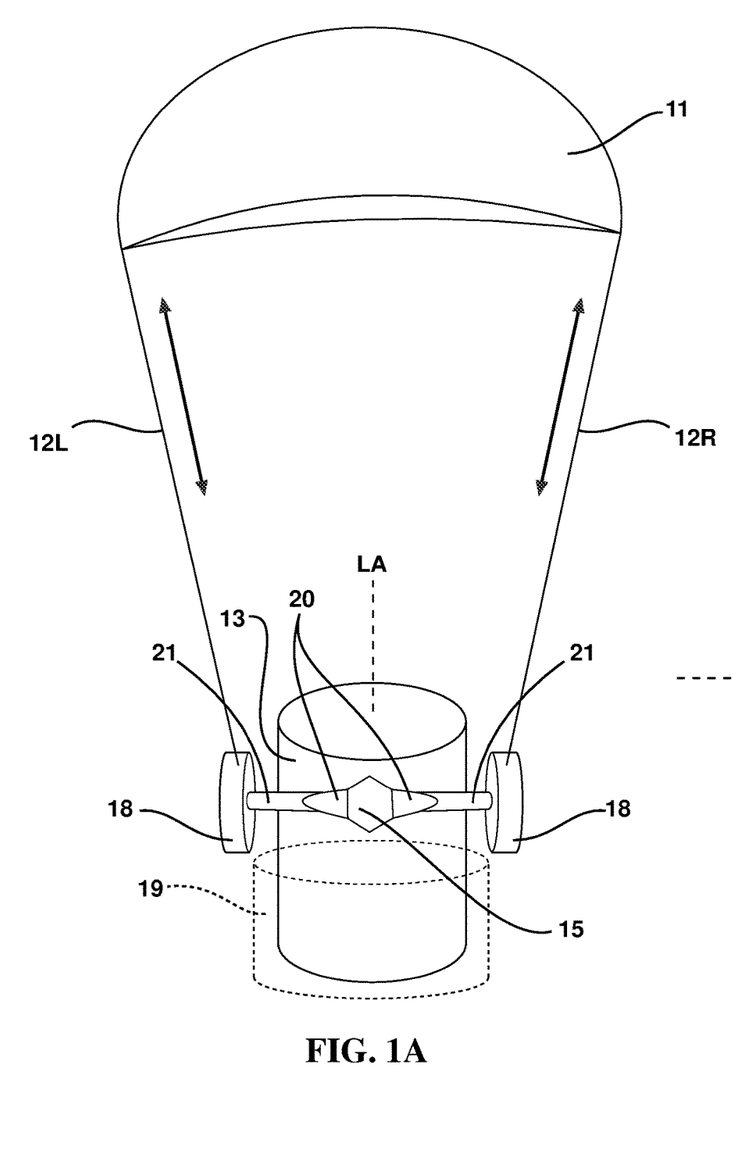
FIG. 1A is a schematic view of a first embodiment of steerable parachute and payload according to the present invention and having a single motor.
Figure 1A:
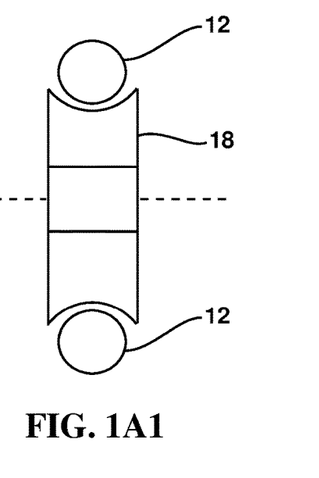

Referring to FIG. 1A and FIG. 1A1, the invention comprises a steerable parachute 10 defining a longitudinal axis LA. The longitudinal axis LA is identically vertical during vertical descent. The steerable parachute 10 has a deployable canopy 11 to provide drag or lift and thereby slow descent. The steerable parachute 10 has a basket 13 for conveying payloads from the drop vehicle to the ground. The basket 13 is suspended from the canopy 11 by plural guy wires 12L, 12R and carries a removable payload.

A padded cup 19 may be removably joined to the basket 13 for protection upon landing. The basket 13 may be made of PETG or PLA, with a TPU cup 19. The steerable parachute 10 is guided towards and preferably to a target TX by a drive system 14. Except as specifically claimed below, the particular payload and target TX form no part of the claimed invention.

Examining the steerable parachute 10 in more detail, the canopy 11 may be any desired shape, preferably rectangular as is known to be desirable. The canopy 11 may have a wingspan of 2.5 to 3 meters. While two guy wires 12L, 2R are shown with one guy wire 12 at each end of the rectangular canopy 11, one of skill will recognize the invention is not so limited. Each corner of a rectangular canopy 11 may have a guy wire 12, with guy wires 12L, 12R, on a common short side of a rectangular canopy 11 being connected to a common reel 18 as described below. Thus, each of the guy wires 12L, 12R, as illustrated represents two guy wires 12L, 12R with one behind the other in the frontal view.

The drive system 14 may be functionally intermediate the guy wires, 12L, 12R and the basket 13. The drive system 14 may be mounted to the basket 13 in known fashion. The drive system 14 comprises a motor 15, optionally bilateral, powered by a battery 17 and optionally solar assisted. The motor 15, in turn operates responsive to signals from a controller 16. The motor 15, controller 16 and battery 17 may comprise an integral assembly or individual components connected in known, operable manner.

The controller 16 may comprise a receiver to optionally dynamically operate the motor 15 in dynamic response to operator 70 signals. The motor 15, battery 17 and controller 16 may be centrally disposed in the basket 13 for balance. The operator 70 may be stationed on the ground, in an aircraft or depending from another parachute [not shown]. Alternatively, the controller 16 may be pre-programmed to follow a predetermined route from the drop to target TX. In either embodiment the controller 16 sends command signals to the motor 15 to impart rotation to one or both of the output shafts 21 to cause lengthening or shortening of the respective guy wire 12.

A single motor 15 preferably has mutually opposed output shafts 21, with a proximal end juxtaposed with the motor 15 housing and a distal end remote therefrom. The opposed shafts 21 may be substantially perpendicular to the longitudinal axis LA. Each shaft 21 is optionally connected to a differential 20. The differential 20 provides mutually opposed rotational directions for the opposed output shafts 21. Each output shaft 21, in turn is connected to a respective axially rotatable reel 18. The reels 18 may be an integral part of or extension of the output shafts 21 and juxtaposed with the distal end thereof. Preferably the reels 18 are larger in diameter than the shafts 21, to provide for increased torque and circumferential sweep per rotation.

Each reel 18, in turn, has at least one respective variable length guy wire 12L, 12R wound therearound in pulley fashion. The reels 18, in turn, rotate about the axis of the shafts 21 to vary the length of and immediately effect shortening or lengthening of the respective guy wires 12, dependent upon the direction of winding about the corresponding reel 18. The variable length of a guy wire 12 is considered to be the effective taut length from the tangent point of the reel 18 to attachment point at the canopy 11.

Generally the reels 18 will counter-rotate, i.e. rotate in the same or opposite directions so that one reel 18 winds the respective guy wire 12 while the other reel 18 unwinds the respective guy wire 12. Depending upon the winding direction of the guy wires 12, the reels may rotate in the same or opposite directions. Counter-rotating reels 18 provide the benefit offsetting superimposed torques.

As a reel 18 contracts a guy wire 12 by winding the guy wire 12 around the reel 18, the corresponding spaced apart points of the canopy 11 to which the guy wire 12 is attached is drawn downwardly, towards basket 13. This change in canopy 11 position cants the canopy 11 towards the direction of the opposite side. The steerable parachute 10 then navigates towards the direction of the cant.

The controller 16 may comprise: a 2 KB SRAM, 1 KB EEPROM, 32 KB flash memory, 16 MHz clock speed board; a 3A continuous, 5A peak, 20 KHz PWM motor 15 driver carrier; and 10 Hz, multi-channel, internal datalogging, −165 dBm GPS module. An Arduino Uno Rev 3 board available from Arduino S.r.l., Partita IVA, a Freescale Semiconductor Dual MC33926 dual motor 15 driver carrier available from NXP Semiconductors, Inc. of Eindhoven, AG and a PA1616S Ultimate GPS Breakout module available from Adafruit Industries of NY, NY have been found suitable, respectively.

The software for the controller 16 preferably supports six decimal, floating point variables for paired GPS coordinate directionality and guidance. The function of the code stored on the board is to record a stored target TX latitude and longitude for use in the code.

Figure 1B:
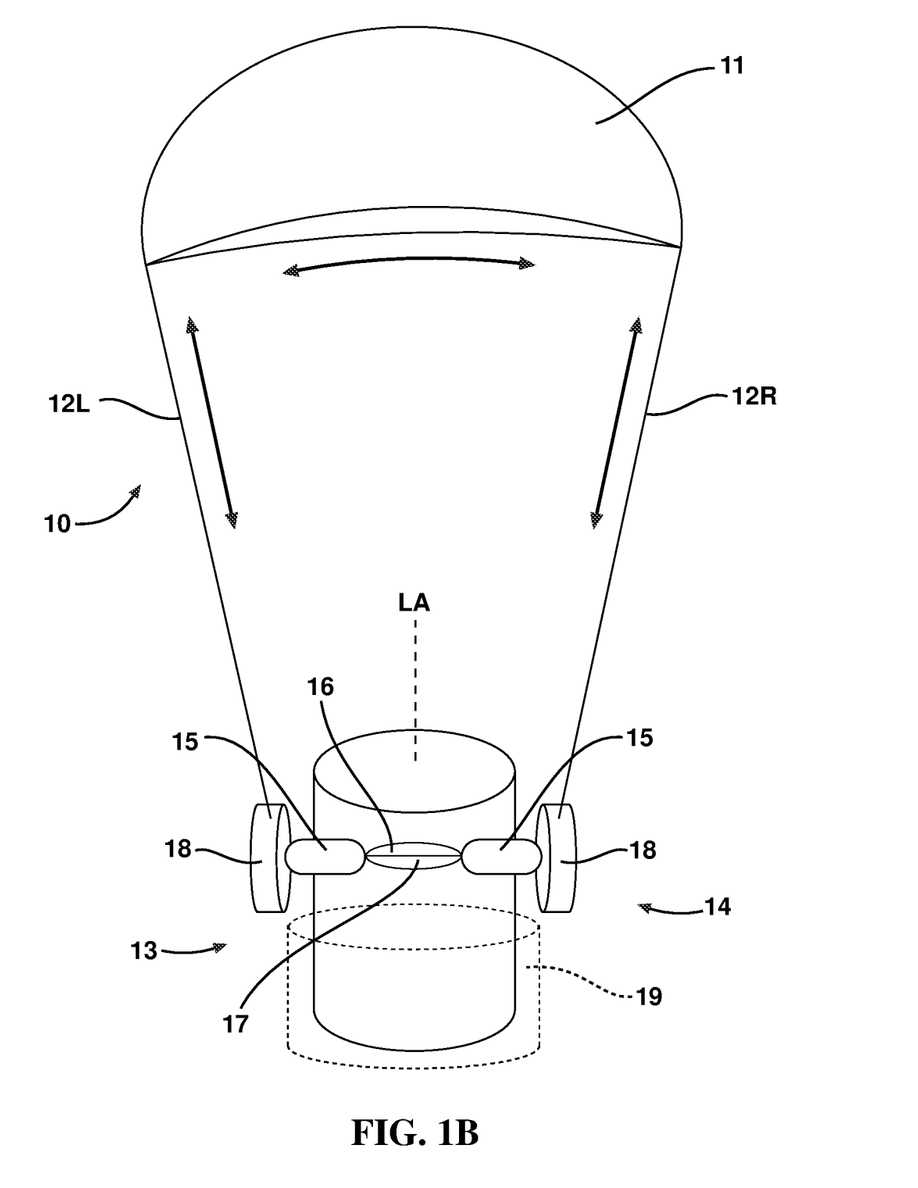
FIG. 1B is a schematic view of a first embodiment of steerable parachute and payload according to the present invention and having dual motors.

Referring to FIG. 1B, in an alternative embodiment the drive system 14 may comprise two paired motors 15 with mutually opposed output shafts 21, with one motor 15 dedicated to each reel 18. The motors 15, shafts 21 and reels 18 are preferably coaxial. By coaxial it is meant the shaft 21 lie on a common and straight axis and the reel 18, if present, is concentric with the shaft 21. Each motor 15 may be controlled by a dedicated controller 16 or preferably are controlled by a common controller 16 for computational efficiency. This embodiment provides the benefit of more precise and responsive control to the reels 18.

Figure 2:
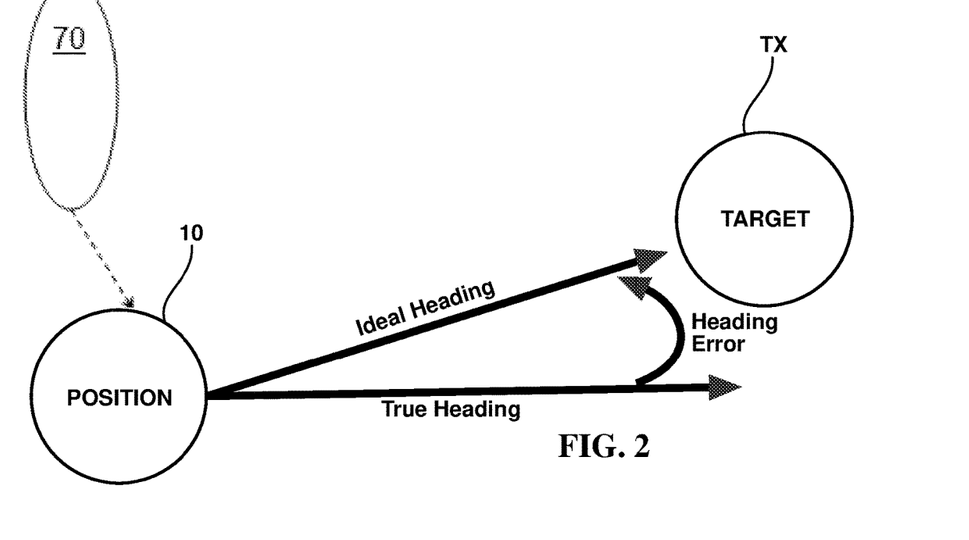
FIG. 2 is a schematic top plan view of an error encountered by a parachute being guided towards a target.
Figures 3A, 3B, 3C:
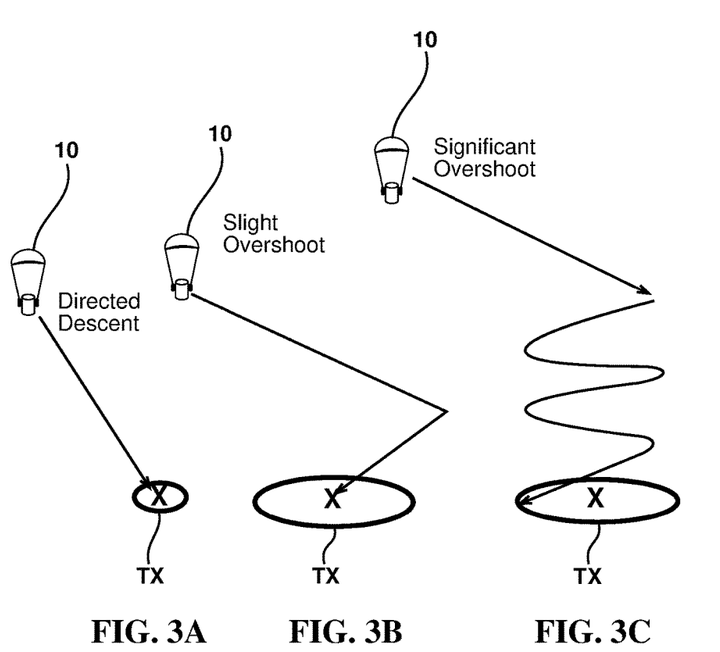
FIG. 3A is a schematic elevational view of parachute having a desired descent towards a target.
FIG. 3B is a schematic elevational view of parachute having a slight overshoot during descent towards a target.
FIG. 3C is a schematic elevational view of parachute having a complex overshoot during descent towards a target.
Figure 3D:
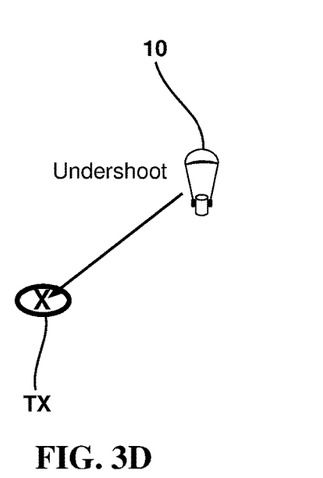
FIG. 3D is a schematic elevational view of parachute having a slight undershoot during descent towards a target.

Referring to FIG. 2, the steerable parachute 10 is given a coordinate pair for the target TX. The GPS module of the controller 16 records the position of the steerable parachute 10 in real time. The controller 16, and particularly the GPS module thereof may then use a function to calculate the heading between the two points.

Using a model predictive control algorithm that is stored on the controller, the controller computes a desired trajectory for the steerable parachute 10 that is based on the difference between its desired target TX position, the current GPS-provided position of the parachute 10, and the physics-based flight dynamics of the parachute 10 as known a priori. Given the desired trajectory, the controller 16 compares this to the instantaneous trajectory, again provided by GPS and other sensors, if available (airspeed, barometric or ultrasonic altitude sensor, inertial measurement unit). The trajectory consists of a translational velocity vector and a rotational velocity vector. Trajectory error signals are computed by subtracting the desired trajectory vectors from the instantaneous vectors, computing a 6×1 error vector.

Then, using a pre-computed mathematical dynamics model of the steerable parachute 10 that may be stored on the controller 16, the controller 16 computes desired adjustments to the airfoil that are needed to obtain the desired trajectory and minimize the error vector. Control corrections are computed by the controller 16 and commands are provided to the motors 15 to adjust the guy wires 12 as needed to correct the course. Guy wires 12 may be shortened on either the left or right, or both, as desired. Shortening the guy wires 12 on either side will cause the canopy 11 to rotate in that direction, and increase the rate of descent until the guy wire 12 is returned to its nominal length. To increase the rate of descent while maintaining course, both guy wires 12 may be shortened.

A 0.5 second loop repeat rate has been found suitable. If desired a proportional-integral-derivative (PID) control loop may be used to improve guided flight accuracy.

Referring to FIG. 3A, FIG. 3B, FIG. 3C and FIG. 3D, the steerable parachute 10 may wind in a respective guy wire 12 to cant the canopy 11 and move the steerable parachute 10 towards the direction of the other guy wire 12. Alternatively or additionally, a reel 18 may rotate to lengthen a guy wire 12, canting the canopy 11 in that direction and maneuvering the steerable parachute 10 in that direction as needed to approach the target TX.

Figure 4:
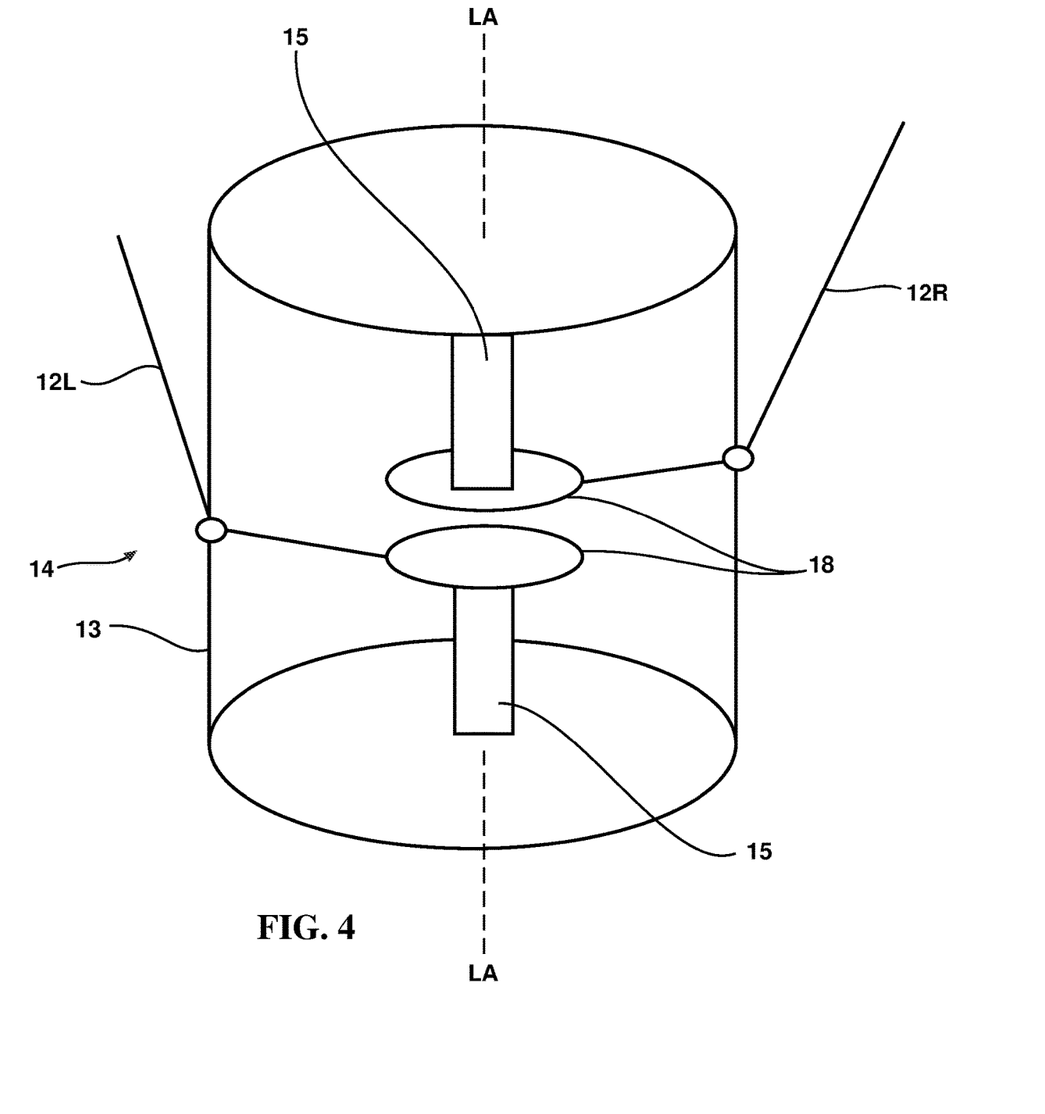
FIG. 4 is a schematic fragmentary perspective view of an alternative embodiment of a drive mechanism usable with a steerable parachute according to the present invention and having vertical axis motors.

Referring to FIG. 4, in a preferred embodiment the axially rotatable reels 18 may be vertically stacked, substantially perpendicular to the longitudinal axis LA and, again, coaxial. Each reel 18 may be driven by a dedicated motor 15 as shown or by a common motor 15 as described above. The vertically stacked motors 15 provide the benefits of a smaller footprint for the basket 13. The vertically stacked rotatable reels 18 prophetically provide the further benefit of improved rotational inertia.

This embodiment provides the further structure that the guy wires 12 intercept the basket 13 at longitudinally offset positions. The offset positions are beneficial because each side of the canopy 11 has a different response to manipulation of the guy wires 12.

Figure 5:
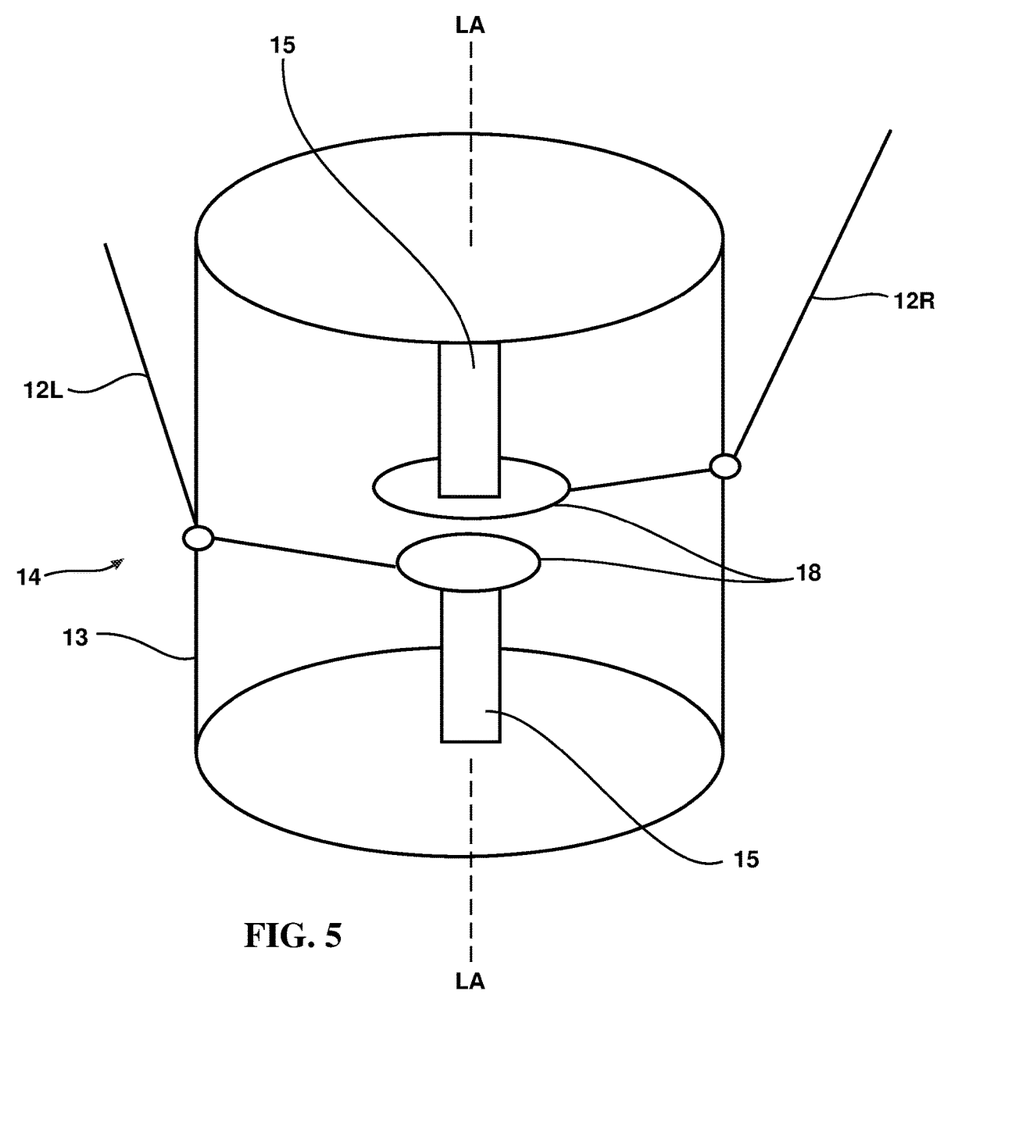
FIG. 5 is a schematic fragmentary perspective view of another alternative embodiment of a drive mechanism usable with a steerable parachute according to the present invention and having vertical axis motors with different diameter reels.

Referring to FIG. 5, in a more preferred embodiment the reels 18 of a vertically stacked drive system 14 may have mutually different diameters. This arrangement further provides the benefit that the larger diameter reel 18 may be used to wind and unwind the corresponding guy wire(s) 12 for coarse steering commands. The smaller diameter reel 18 may be used to wind and unwind the corresponding guy wire(s) 12 for fine steering commands. While a steerable parachute 10 having the larger diameter reel 18 above and closer to the canopy 11 than the smaller diameter reel 18 is shown, one of skill will recognize the invention is not so limited and the smaller diameter reel 18 may be disposed above the larger diameter reel 18 to be closer to the canopy 11.

Figure 6:
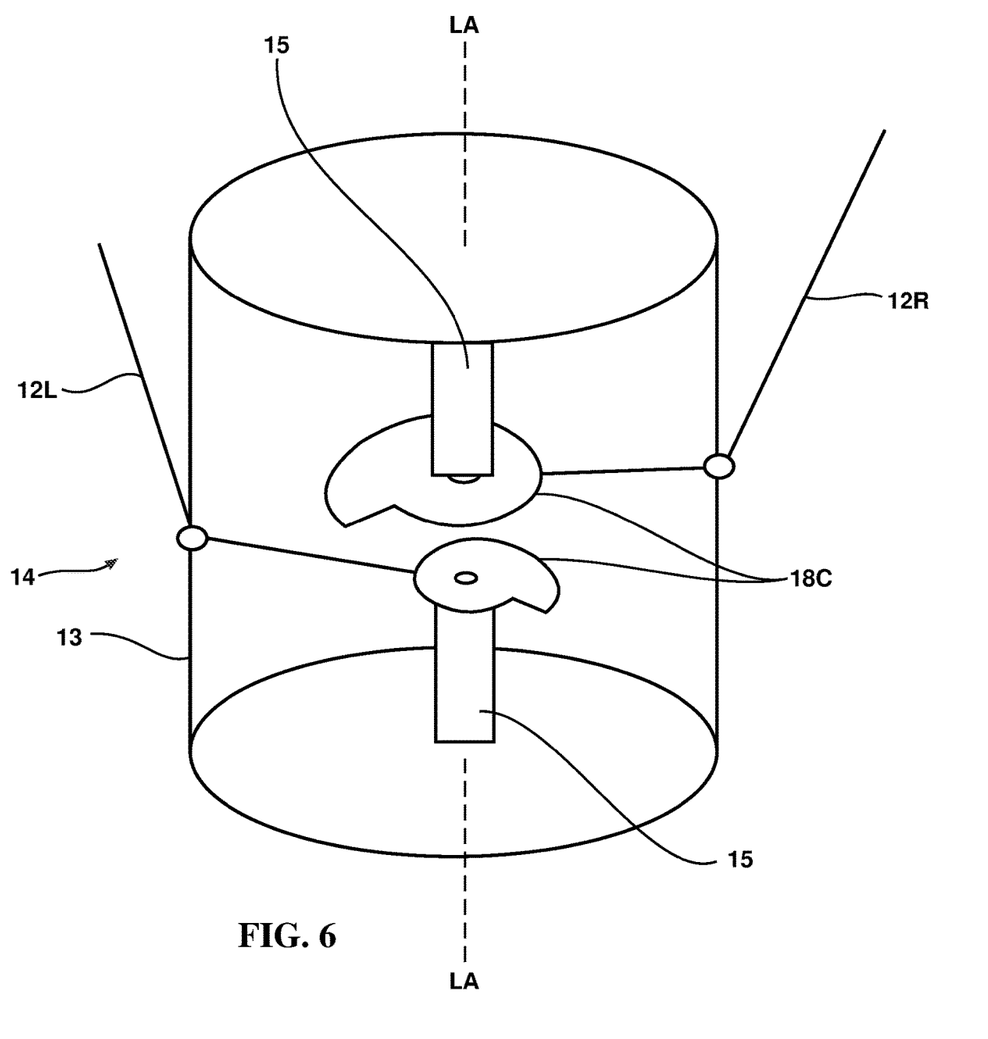
FIG. 6 is a schematic fragmentary perspective view of another alternative embodiment of a drive mechanism usable with a steerable parachute according to the present invention and having vertical axis motors with different cams for the reels.

Referring to FIG. 6, in an even more preferred embodiment each reel 18 may comprise a cam 18C. The cam 18C may have a profile generally perpendicular to the longitudinal axis LA and providing variable radial distance therefrom. This arrangement provides the benefit that as radius increases, the guy wires 12 will become more sensitive to rotational displacements of the motor 15. While a steerable parachute 10 having the larger cam 18C above and closer to the canopy 11 than the smaller cam 18C is shown, one of skill will recognize the invention is not so limited and the smaller cam 18C may be disposed above the larger cam 18C to be closer to the canopy 11.

The cams 18C may be of equal size or of unequal sizes and congruent. The cam 18C profile may provide limited dwell, and preferably no dwell, to minimize shaft 21 rotation which has no effect on lengthening or shortening the respective guy wire 12.

Referring to FIG. 7 and FIG. 8, in another embodiment the drive system 14 may comprise an epicyclic gear. In this system the motor 15 may be operably connected, through the output shaft 21, to a planetary gear system 18P. The planetary gear system 18P has an axially rotatable ring gear 28 which is operably joined to a respective guy wire 12. The ring gear 28 is concentric to a sun gear 38 and may be driven by planet gears 48 in known fashion. This arrangement provides the benefit that a small rotation by the output shaft 21 of the motor 15 results in a much larger rotational response by the ring gear 28 and respective guy wire 12. The steering is more responsive and quicker for controlling descent and steering in adverse environments.

The dual planetary gear 18P drive systems 14 as shown may be re-oriented to provide coaxial motors 15, as described above. This hybrid arrangement provides the further benefit of increasing the cant of the drive system 14.

Figure 9:
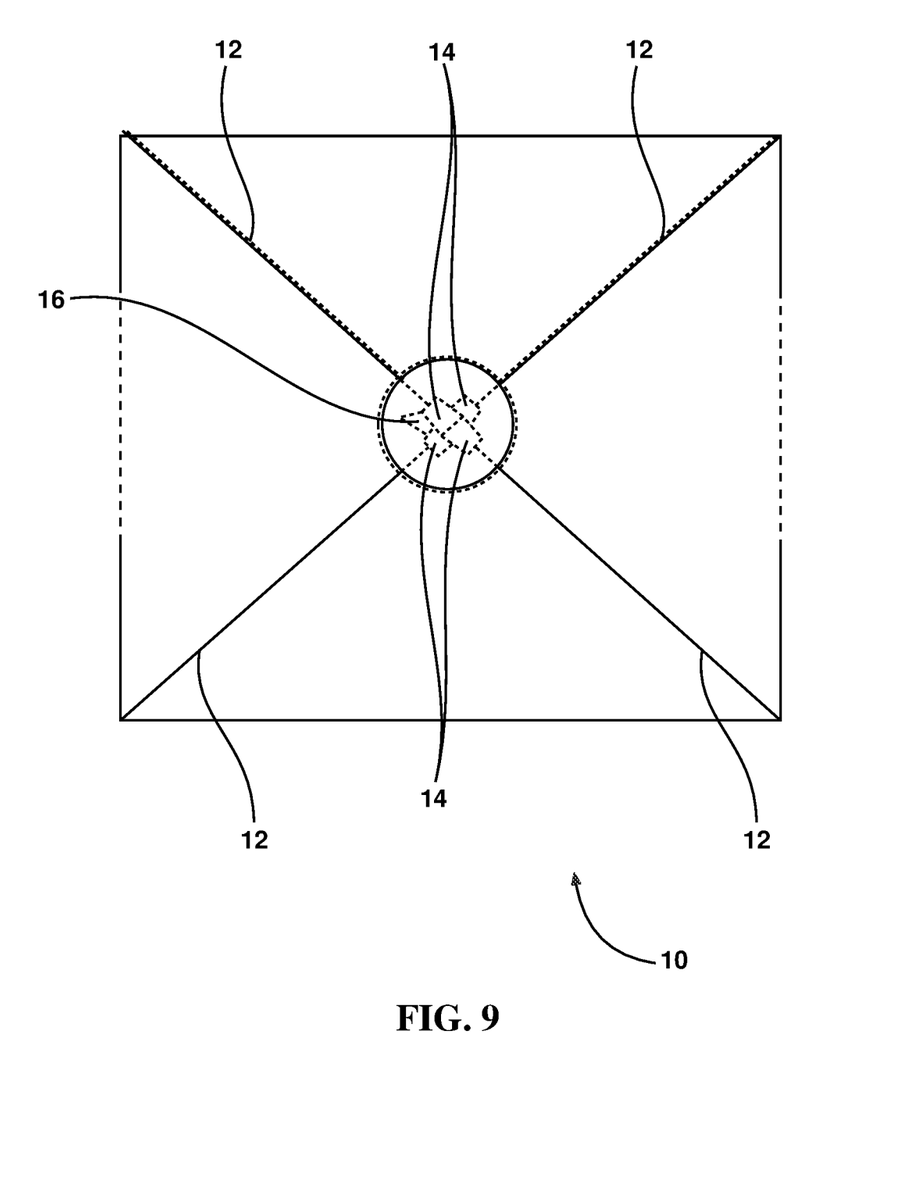
FIG. 9 is a bottom plan view of an alternative embodiment of a steerable parachute having four drive motors.

Referring to FIG. 9, in another embodiment the steerable parachute 10 of the present invention is not limited to two drive systems 14 as shown above. The steerable parachute 10 may have four drive systems 14s, each with an associated guy wire 12, which connects to a corner of a square or rectangular canopy 11. Prophetically this arrangement provides improved X-Y control of the steerable parachute 10 during descent.

In operation, the steerable parachute 10 descends under gravity influence. The descent has a vector component in a horizontal direction 60H and a vector component in the vertical direction 60V. The horizontal direction 60H component and vertical direction 60V component are vector summed to a resultant direction 60R. As the operator 70 wishes to steer the steerable parachute 10 towards a target TX, the guy wire 12 opposite the target TX is wound in to be short, increasing the horizontal direction 60H component.

In a nonlimiting example, a 19 meter drop test with a 1.5 kg payload was used for testing. Descent velocity was computed according to:

$$\text{Descent velocity} = \{(2*\text{weight})/(\text{drag coefficient}*\text{air density}*\text{area})\}\exp \tfrac{1}{2}.$$

The descent velocity was calculated to be 3.6 m/s and measured to be 3.9 m/s with a total basket 13 plus payload weight of 4.5 kg to 5 kg.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." The term "or" as used herein is to be interpreted as an inclusive or meaning any one or any combination. Therefore, "A, B or C" means "any of the following: A; B; C; A and B; A and C; B and C; A, B and C." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern according to *Phillips v. AWH Corp.*, 415 F.3d 1303 (Fed. Cir. 2005). All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A steerable parachute for carrying a payload towards a target, the steerable parachute defining a longitudinal axis and comprising:
   a deployable canopy for providing drag or lift during descent of the steerable parachute;
   a basket for conveying payloads to the ground;
   a plurality of guy wires connecting the basket to the canopy at a like plurality of spaced apart attachment points;
   a high cant drive system for canting the canopy in a desired direction and comprising
   at least one motor, the at least one motor having opposed output shafts with a first output shaft joined to a first guy wire and a second output shaft joined to a second guy wire, whereby rotation of the output shafts shortens the first guy wire and/or lengthens the second guy wire to guide the steerable parachute in a desired direction, wherein each of the first output shaft and the second output shaft has a proximal end juxtaposed with the respective motor and a distal end remote therefrom, the first output shaft having a first output shaft diameter and further comprising a first reel juxtaposed with the distal end of the first output shaft, the first reel having a first reel diameter larger than the first output shaft diameter and being joined to a respective guy wire and the second output shaft having a second output shaft diameter and further comprising a second reel juxtaposed with the distal end of the second output shaft, the second reel having a second reel diameter larger than the second output shaft diameter and being joined to a respective guy wire, wherein the first reel and the second reel have mutually different diameters; and
   a controller for sending command signals to the motor to impart rotation to the opposed output shafts.

2. A steerable parachute according to claim 1 wherein the opposed shafts are substantially perpendicular to the longitudinal axis.

3. A steerable parachute according to claim 2 wherein the controller receives signals from an operator to dynamically control the motor during descent of the steerable parachute.

4. A steerable parachute according to claim 1 wherein each shaft has a proximal end juxtaposed with the motor and a distal end remote therefrom, the shaft having a shaft diameter and further comprising a reel juxtaposed with the distal end of the shaft, the reel having a reel diameter larger than the shaft diameter and being joined to a respective guy wire.

5. A steerable parachute according to claim 4 further comprising a differential operably associated with the motor so that the output shafts counter-rotate to simultaneously shorten the first guy wire and lengthen the second guy wire.

6. A steerable parachute for carrying a payload towards a target, the steerable parachute defining a longitudinal axis and comprising:
   a deployable canopy for providing drag or lift during descent of the steerable parachute;
   a basket for conveying payloads to the ground;
   plural variable length guy wires connecting the basket to the canopy at plural spaced apart attachment points;
   a high cant drive system for canting the canopy in a desired direction and comprising
   a first motor having a first output shaft and a second motor having a second output shaft coaxial therewith, the first output shaft joined to a first guy wire and the second output shaft joined to a second guy wire, whereby rotation of the first output shaft or second output shafts shortens or lengthens the first guy wire or second guy wire, respectively to guide the steerable parachute in a desired direction, wherein each of the first output shaft and the second output shaft has a proximal end juxtaposed with the respective motor and a distal end remote therefrom, the first output shaft having a first output shaft diameter and further comprising a first reel juxtaposed with the distal end of the first output shaft, the first reel having a first reel diameter larger than the first output shaft diameter and being joined to a respective guy wire and the second output shaft having a second output shaft diameter and further comprising a second reel juxtaposed with the distal end of the second output shaft, the second reel having a second reel diameter larger than the second output shaft diameter and being joined to a respective guy wire, wherein the first reel and the second reel have mutually different diameters; and
   a controller for sending command signals to the motor to impart rotation to the first and second output shafts.

7. A steerable parachute according to claim 6 wherein the first shaft and the second shaft are coaxial with the longitudinal axis.

8. A steerable parachute according to claim 6 wherein the first reel and the second reel are substantially perpendicular to the longitudinal axis.

9. A steerable parachute according to claim 6 wherein first reel has a greater diameter than the second reel and is disposed closer to the canopy than the second reel.

10. A steerable parachute according to claim 6 wherein the high cant drive system comprises a first planetary gear system operably disposed intermediate the first motor and the respective guy wire and a second planetary gear system disposed intermediate the second motor and the respective guy wire.

11. A steerable parachute according to claim 10 wherein the first planetary gear system comprises a first sun gear joined to the first output shaft and having a first ring gear concentric therewith and the second planetary gear system comprises a second sun gear joined to the second output shaft and having a second ring gear concentric therewith.

12. A steerable parachute for carrying a payload towards a target, the steerable parachute defining a longitudinal axis and comprising:
   a deployable canopy for providing drag or lift during descent of the steerable parachute;
   a basket for conveying payloads to the ground;
   plural variable length guy wires connecting the basket to the canopy at plural spaced apart attachment points;
   a high cant drive system for canting the canopy in a desired direction and comprising
   a first motor having a first output shaft and a second motor having a second output shaft coaxial therewith, the first output shaft joined to a first guy wire and the second output shaft joined to a second guy wire, whereby rotation of the first output shaft or second output shafts shortens or lengthens the first guy wire or second guy wire, respectively to guide the steerable parachute in a desired direction, wherein each of the first output shaft and the second output shaft has a proximal end juxtaposed with the respective motor and a distal end remote therefrom, the first output shaft having a first output shaft diameter and further comprising a first variable radius cam juxtaposed with the distal end of the first output shaft, the first cam having a first cam profile larger than the first output shaft diameter and being joined to a respective guy wire; and the second output shaft having a second output shaft diameter and further comprising a second variable radius cam juxtaposed with the distal end of the second output shaft, the second cam having a second cam profile larger than the second output shaft diameter and being joined to a respective guy wire.

13. A steerable parachute according to claim 12 wherein the first cam profile is larger than the second cam profile.

14. A steerable parachute according to claim 13 wherein first cam is disposed closer to the canopy than the second cam.

\* \* \* \* \*